(12) United States Patent
Small et al.

(10) Patent No.: US 6,738,523 B1
(45) Date of Patent: May 18, 2004

(54) PARALLEL INVERSE DISCRETE WAVELET TRANSFORM

(75) Inventors: Jeffrey A. Small, Rochester, NY (US); Mark D. Brown, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 619 days.

(21) Appl. No.: 09/662,273

(22) Filed: Sep. 14, 2000

(51) Int. Cl.[7] .............................. G06K 9/46; G06K 9/36
(52) U.S. Cl. .................... 382/240; 382/234; 382/233; 382/248; 375/240.19; 375/240.11; 348/398.1
(58) Field of Search .................... 382/232, 233, 382/242, 248, 234, 238, 240, 260, 263, 264, 266, 305, 173; 375/240.11, 240.18, 240.19; 348/398.1

(56) References Cited

U.S. PATENT DOCUMENTS

| | | |
|---|---|---|
| 5,412,741 A | 5/1995 | Shapiro |
| 5,481,308 A | 1/1996 | Hartung et al. |
| 5,546,477 A | 8/1996 | Knowles et al. |
| 5,657,085 A | 8/1997 | Katto |
| 5,710,835 A | 1/1998 | Bradley |
| 5,798,794 A | 8/1998 | Takahashi |
| 5,825,935 A | 10/1998 | Murakoshi |
| 5,875,122 A | 2/1999 | Acharya |
| 5,926,791 A | 7/1999 | Ogata et al. |
| 5,982,434 A | 11/1999 | Tong et al. |
| 5,995,210 A | 11/1999 | Acharya |
| 6,546,143 B1 * | 4/2003 | Taubman et al. ............ 382/240 |
| 6,549,673 B1 * | 4/2003 | Ammicht et al. ............ 382/240 |
| 6,553,147 B2 * | 4/2003 | Chai et al. .................... 382/240 |
| 6,567,081 B1 * | 5/2003 | Li et al. ....................... 345/419 |

* cited by examiner

Primary Examiner—Timothy M. Johnson
Assistant Examiner—Ali Bayat
(74) Attorney, Agent, or Firm—David M. Woods (57) ABSTRACT

It is, therefore, an object of the present invention to provide a structure and method of processing signals, which includes transforming a signal into subbands by applying a forward discrete wavelet transform (FDWT) to the signal, partitioning the subbands into overlapping subband subsets, inverse transforming the overlapping subband subsets into signal subsets by applying at least one inverse discrete wavelet transform (IDWT) to the overlapping subband subsets, and combining the signal subsets to reproduce the signal. The IDWT is applied to all of the subband subsets in parallel.

23 Claims, 7 Drawing Sheets

| INPUT DATA | STORAGE ELEMENTS READ | RESULTING CALCULATIONS AND OUTPUTS |
|---|---|---|
| $L_0$ | NONE | $A = 4L_0$ |
| $H_0$ | A | $B = H_0$; $X_0 = (A-2H_0)/4$; $A = (A-2H_0)$ |
| $L_1$ | A, B | $C = 4L_1 - B$; $B = 8B + A$ |
| $H_1$ | B, C | $A = H_1$; $X_1 = (B+(C-H_1))/8$; $X_2 = (C-H_1)/4$; $C = (C-H_1)$ |
| $L_2$ | C, A | $B = 4L_2 - A$; $A = 8A + C$ |
| $H_2$ | A, B | $C = H_2$; $X_3 = (A+(B-H_2))/8$; $X_4 = (B-H_2)/4$; $B = (B-H_2)$ |
| $L_3$ | B, C | $A = 4L_3 - C$; $C = 8C + B$ |
| $H_3$ | C, A | $B = H_3$; $X_5 = (C+(A-H_3))/8$; $X_6 = (A-H_3)/4$; $A = (A-H_3)$ |
| $L_4$ | A, B | $C = 4L_4 - B$; $B = 8B + A$ |
| $H_4$ | B, C | $A = H_4$   $X_7 = (B+(C-H_4))/8$; $X_8 = (C-H_4)/4$; $C = (C-H_4)$ |
| -- | C, A | $A = 8A + C$ |
| -- | A, C | $X_9 = (A+C)/8$ |

PARALLEL INVERSE DISCRETE WAVELET TRANSFORM

FIELD OF THE INVENTION

The present invention generally relates to wavelet-based image compression systems and more particularly to an image compression system that performs inverse discrete wavelet transform processing in parallel to achieve higher processing speeds.

BACKGROUND OF THE INVENTION

Conventional wavelet-based image compression systems apply a two-dimensional forward wavelet transform to an image in order to transform the image into subbands. Each such subband is a band pass filtered and reduced resolution version of the original image. This permits the subbands to be amenable to compression by various means. Reconstruction of the original image requires that all such subbands must first be decompressed, followed by the application of an inverse discrete wavelet transform (IDWT) to transform these subbands back into the original image.

Although the present invention does not depend on lifting (described below), its utility is greatly enhanced by lifting. The invention also utilizes tiling to allow random and/or multiresolution access.

Tiling is described in detail in U.S. Pat. No. 5,710,835 (hereinafter '835) and the same is incorporated herein by reference. The invention described below is fundamentally different than the system described in '835 because the '835 system is designed to reduce the hardware necessary to perform the lifting/tiling operations. To the contrary, the present invention is designed to increase processing speed. In its operations, the present invention performs many actions in parallel, which actually increases the number of required hardware components (which is in direct contrast to the goal of reducing hardware components in '835). The '835 patent tiles the image with possibly overlapping tiles, so as to facilitate random access during reconstruction. This also is done to decrease the amount of processing hardware and to decrease the required processing speed. As discussed below, the invention tiles each subband with minimally overlapping tiles, with no concern towards random access. This is done to increase the amount of processing hardware in order to increase the net processing speed.

SUMMARY OF THE INVENTION

It is, therefore, an object of the present invention to provide a structure and method of processing signals, which includes transforming a signal into subbands by applying one or more forward discrete wavelet transforms (FDWT) to the signals as in the Mallat decomposition described in ISO/IEC 15444-1, partitioning the resulting subbands into overlapping subband subsets, inverse transforming the overlapping subband subsets into signal subsets by applying one or more inverse discrete wavelet transforms (IDWT) to the overlapping subband subsets, and combining the resulting signal subsets to reproduce the signal. The IDWT is applied to all of the subband subsets in parallel. The inverse transform operation includes performing lifting upon the subband subsets to minimize the required overlap between adjacent overlapping subband subsets. The partitioning is performed so as to minimize an overlap between adjacent overlapping subband subsets. The invention can further include discarding excess sample values that occur as a result of overlap between adjacent overlapping subband subsets.

The invention can thus comprise a method of image compression utilizing inverse discrete wavelet transforms (IDWT), including partitioning a set of forward discrete wavelet transform (FDWT) coefficients into two or more overlapping subband subsets, simultaneously performing an IDWT of each subset using lifting (such that an overlap between adjacent subband subsets is minimized), recombining the subband subsets, and discarding excess sample values that occur as a result of overlap between adjacent subband subsets.

ADVANTAGES OF THE INVENTION

One advantage of the invention lies in speeding up inverse discrete wavelet transformations (IDWT) of subband data. This is done by partitioning the data input to the IDWT in a specific and minimally overlapping manner, to allow multiple IDWT operations to be performed on these partitions in parallel. Another advantage of the invention lies in the reduction of the size required of memory elements used in storing intermediate values within a multi-dimensional IDWT. The invention allows such memory element reduction because the required lengths of these elements are proportional to the length of each subset that is being inverse transformed. Thus, by reducing the lengths of the subsets, the required length of the memory element is correspondingly reduced.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE INVENTION

The invention comprises a system and method for speeding up the inverse discrete wavelet transform (IDWT) of subband data. This is done by partitioning the data input to the IDWT in a specific and minimally overlapping manner, to allow multiple IDWT operations to be performed on these partitions in parallel. This partitioning scheme is particularly suited to IDWT schemes that are implemented with the "lifting" technique.

Lifting is a different approach to the design and implementation of wavelet transform filters. For a given filter pair, the resulting transformed data is exactly the same for a lifting implementation as it is for a conventional implementation using convolution.

Lifting has the following benefits. The memory requirements are reduced by a factor approaching one half, resulting in considerable memory savings for multi-dimensional forward and inverse DWT's. Also, lifting simplifies the hardware implementation and image boundaries are easier to handle with lifting. Further, the output data for any given subband is generated in a raster order. However, the data from all subbands is generated in an interleaved fashion. Lifting is an easy means to derive and implement perfect reconstruction filter pairs. Once the interpolation filter is selected (i.e. the high-pass filter), the low-pass filter is easily constructed using algebra.

Lifting includes three basic steps. First the image is split into two sequences of odd and even pixels. This is the "lazy" wavelet transform. Secondly, lifting predicts the odd sequence's pixels by interpolation from the nearby pixels in the even sequence and transmits the difference between this predicted sequence and the actual odd sequence. Thirdly, lifting updates the sequence of even pixels by adding them to interpolated versions from the above-predicted odd sequence. This eliminates aliasing and other deleterious effects caused by the 2X decimation that was used to obtain the sequence of even pixels. Lifting also transmits the updated even sequence.

As will be shown, lifting results in a simple lattice architecture for the signal flow diagram. This allows very straightforward implementations in hardware or software. Any wavelet filter pair designed using the classical Fourier transform method may be factored into one or more pairs of such predict-update steps. Lifting may also be used to design filter pairs that are not easily designed using the Fourier techniques.

The following examines lifting implementations of the Legall 5-3 filter pair and the Debauchies 9-7 filter pair as described in ISO/IEC 15444-1.

Examination of the lifting lattices described in the next section reveals that the high-pass and low-pass outputs are indeed functions of the correct numbers of input samples. By writing the sums at each level of these lattices as functions of the input pixels it can also be seen that lifting is algebraically identical to the convolution implementation of the corresponding filter pair.

Figure 1:
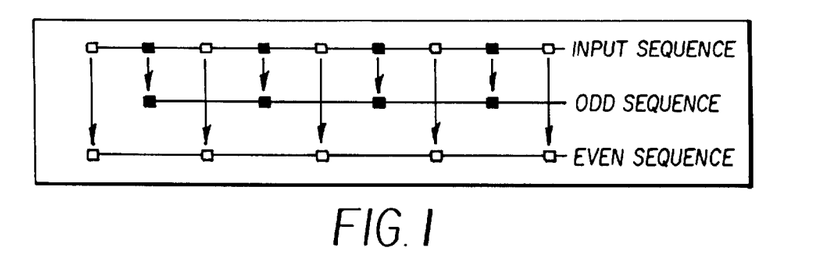
FIG. 1 is a schematic diagram illustrating the splitting of a set of subband data into two partitions.
Figure 2:
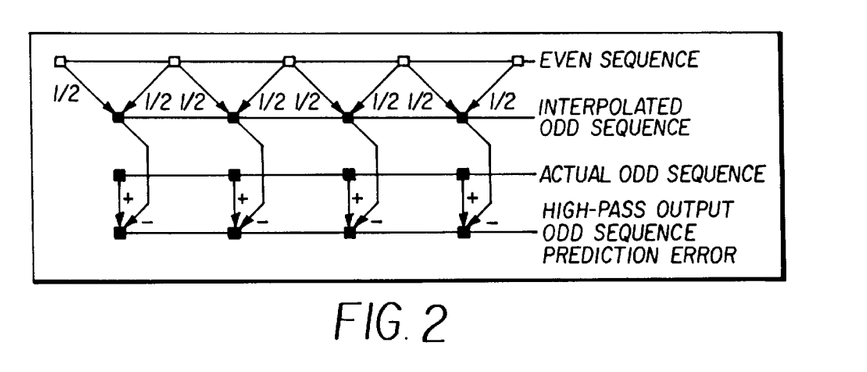
FIG. 2 is a schematic diagram illustrating the implementation of a prediction filter to produce a high-pass subband.
Figure 3:
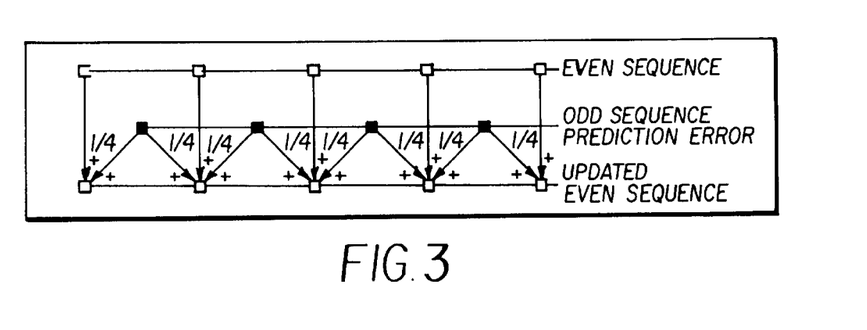
FIG. 3 is a schematic diagram illustrating the implementation of an update filter to produce a low-pass subband.
Figure 4:
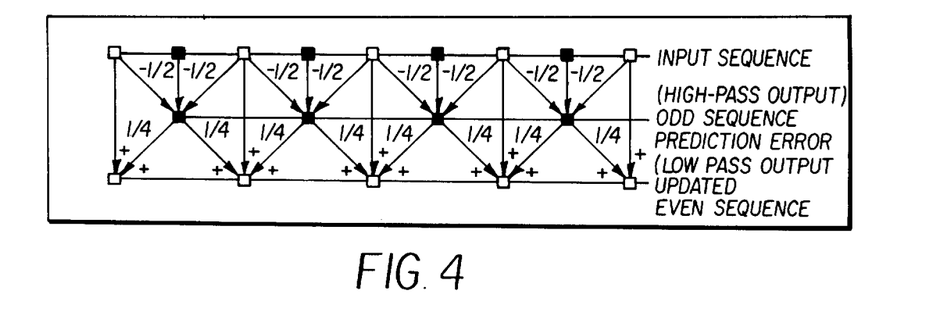
FIG. 4 is a schematic diagram illustrating a lattice structure for a lifting implementation of the Legall 5-3 integer filter pair as in ISO/IEC 15444-1.

FIGS. 1–4 illustrate the implementation steps for the Legall 5-3 filter pair where the high-pass filter=(–½, 1, –½). FIG. 1 illustrates where lifting splits the input into even and odd sequences. FIG. 2 illustrates the prediction of odd sequences and subtraction of the predicted odd sequence from the actual sequence. FIG. 3 shows the update of the even sequence to reduce aliasing. FIG. 4 illustrates that the combination of the previous three steps (e.g., FIGS. 1–3) results in an easily implemented lattice structure.

By working from the bottom up in the FIG. 4, it can be seen that the lifting structure does indeed implement the low-pass and high-pass filters described above.

The Debauchies 9-7 filter pair (to four decimal places) consists of: High-pass Filter=[0.0456, 0.0288, 0.2956, –0.5575, 0.2956, 0.0288, –0.0456] and Low-Pass Filter= [0.0267, –0.0169, –0.0782, 0.2669, 0.6029, 0.2669, –0.0782, –0.0169, 0.0267]. The corresponding lifting coefficients are: $p_1$=–1.586134342, $u_1$=–0.05298011854; $p_2$=0.8829110762, $u_2$=0.443568522. The processing shown in FIGS. 1–4 on the Debauchies 9-7 filter pair results in the lattice structure shown in FIG. 5.

Figure 5:
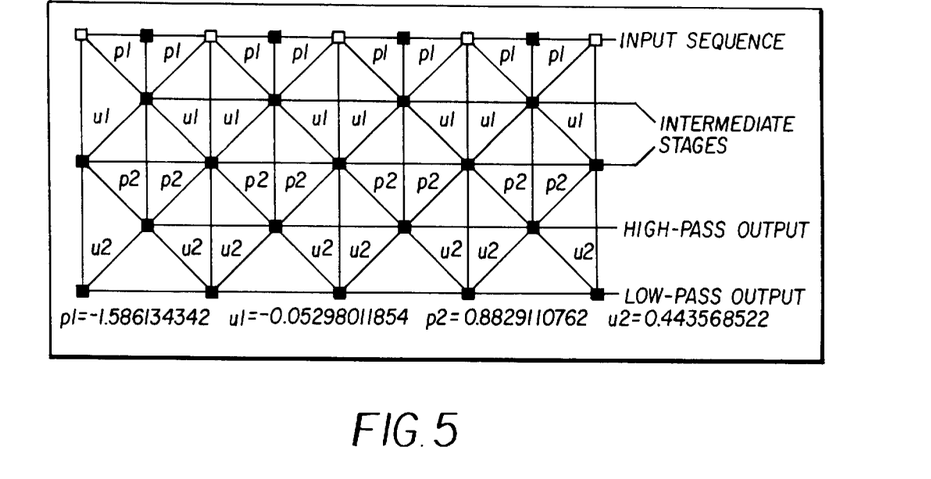
FIG. 5 is a schematic diagram illustrating a lattice structure for a lifting implementation of the Debauchies 9-7 filter pair as in ISO/IEC 15444-1.

The advantages of lifting can be seen in the lattice structure for the 9-7 filter pair. Firstly, only four different coefficient values are required for lifting, in lieu of the nine different values required for the original filter pair. If multiplication is done by look up tables, this can be a significant saving. Secondly, the memory requirements are the five memory units along one of the diagonals, as opposed to the nine that would be required for a conventional FIR convolution architecture.

At the left and right edges of these lattice structures (e.g., FIGS. 4 and 5), symmetric edge extension may be used in order to avoid the introduction of unwanted ringing and high frequencies (which will otherwise reduce the compression efficiency). Fortunately, the lifting architecture is easily adjusted to accommodate such edge extension. More specifically, at each adder in the lattice where a left-hand input is missing, the right-hand input is added in twice. This is easily accomplished by a left shift of the right-hand input data just prior to the adder. Similarly, where a right-hand input is missing, the left-hand input is added in twice.

The sequence of operations for the lifted architecture is relatively straightforward. Each time an odd element is input, processing proceeds down and to the left, as a series of left-hand addition operations along the first diagonal below the input. This partially completes the processing for one high-pass and one low-pass output. Each time an even element is input, processing proceeds down and to the left along the connected diagonal, as a series of right-hand addition operations. Each even input completes the processing for one high-pass and one low-pass output.

Figure 6:
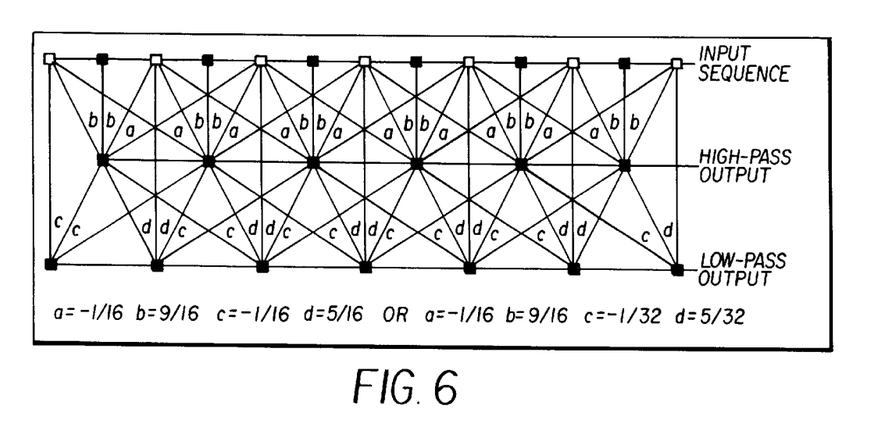
FIG. 6 is a schematic diagram illustrating a lattice structure for a lifting implementation of the CRF 13-7 filter pair as in ISO/IEC 15444-1.

If the coefficients may be exactly expressed as integers, as in the 5-3 example, then the resulting discrete transform is completely reversible and does not result in any losses. Furthermore, if the integers are small values, the transform may be implemented with shift and add operations, rather than with multipliers. However, for the 9-7 example discussed above, the coefficients are irrational and cannot be expressed as integers. Thus, the 9-7 filtering can never be completely without loss. If truly no loss compression is required, these coefficients may be approximated by integers, resulting in a small loss in decorrelation efficiency. Other integer filters, such as the 13-7 filter pair from ISO/IEC 15444-1 implemented in FIG. 6, may give better overall performance than the 5-3 filter pair, and are easier to implement than the irrational 9-7 filter pair.

Figure 7:
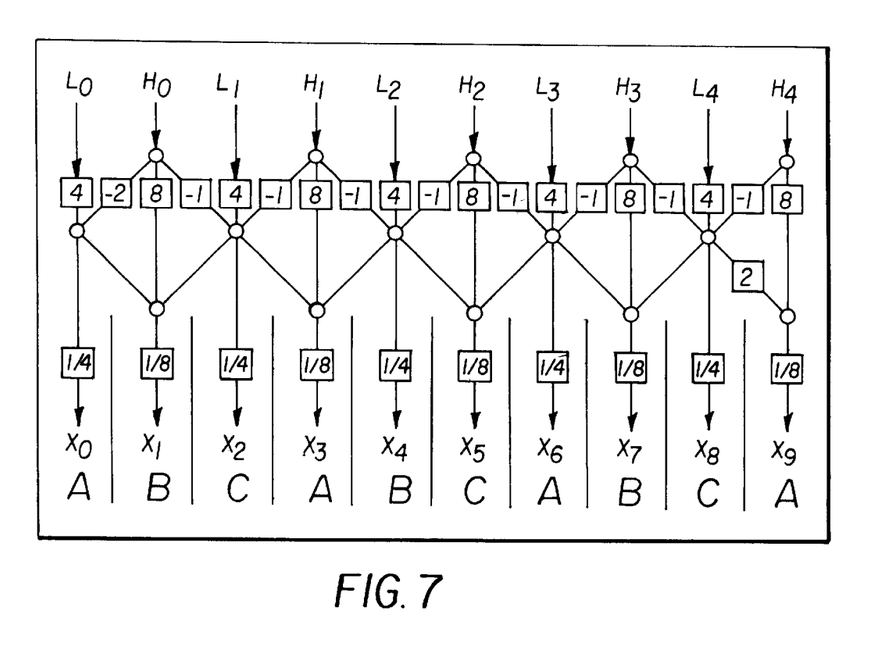
FIG. 7 is a schematic diagram illustrating a lifting implementation of the inverse discrete wavelet transform for the Legall 5-3 filter pair.
Figure 8:
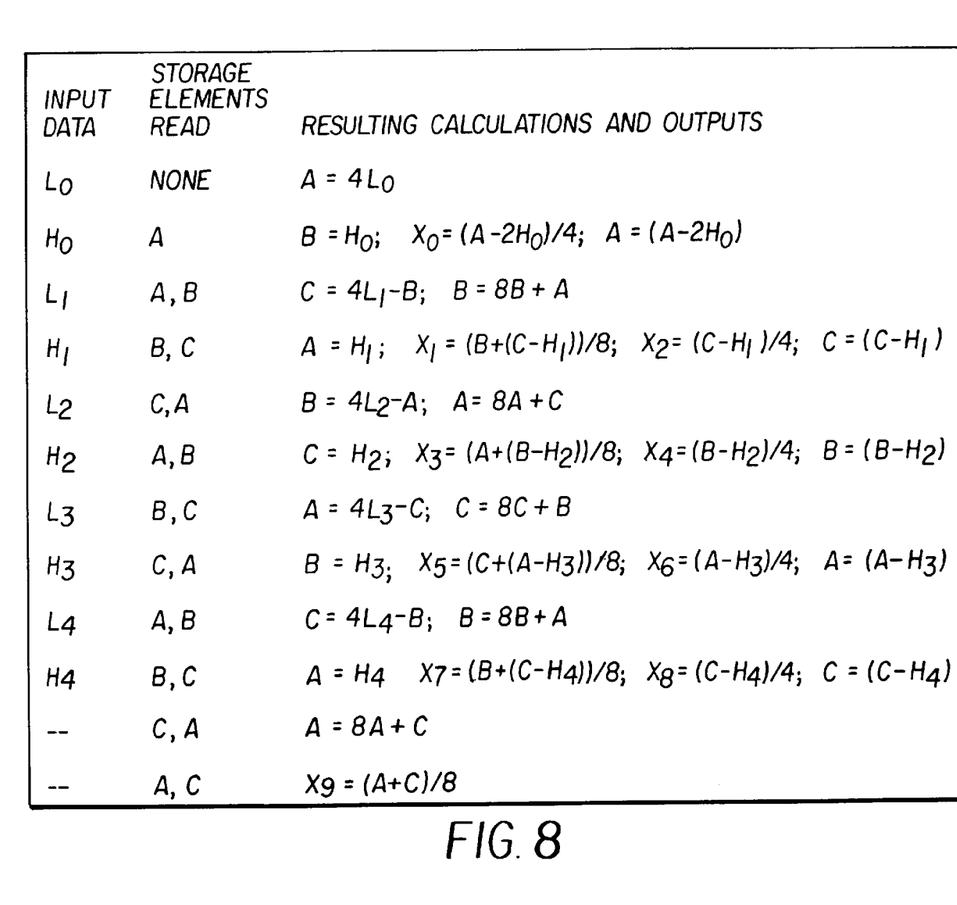
FIG. 8 is a chart illustrating a sequence of calculations for the lifting implementation of the inverse discrete wavelet transform for the Legall 5-3 filter pair.

Referring now to FIGS. 7–8, a hardware implementation for the inverse Legall integer 5-3 discrete transform is illustrated. This implementation requires three storage elements, referred to as elements "A," "B," and "C". These elements can comprise linestores for vertical filtering.

More specifically, FIG. 7 shows the signal flow diagram for the inverse discrete wavelet transform of a ten-element line, as a lattice structure. Each column of this lattice corresponds to a single storage element (which may be either a single word or a linestore) and each node within a column corresponds to different states of that storage element as processing is done. For this filter pair, as shown in FIG. 7, only three elements A, B, and C are needed.

A given storage element may be overwritten only after two conditions are met. First, the element must have been completely processed and sent to the output. Secondly, the element cannot be needed for any future operations. The multiplication by −2 near the upper left corner of the lattice in FIG. 7 has the same effect as reflecting the $H_o$ input about the $L_o$ input, thereby accomplishing the desired symmetric edge extension on the left-hand side. Similarly, the multiplication by 2 near the lower right corner of the lattice in FIG. 7 has the same effect as reflecting the H3 and L4 inputs about the H4 input, accomplishing the desired symmetric edge extension on the right-hand side.

Every $L_N$ results in two "left-hand" operations as shown in FIG. 8. Every $H_N$ results in one storage operation and two "right-hand" operations, generating $X_{2N-1}$ and $X_{2N}$ outputs as shown in FIG. 8. The $X_{2N}$ output is just a shift (divide by four) of one of these right-hand operations. The operations are similar for different values of N, except the storage elements A, B, and C are circularly permutated. In general, each $L_N$ or $H_N$ input requires data to be read from two of the three storage elements, and the resulting calculations are written to two of the three storage elements. Pipeline registers may be inserted as needed. All operations shown on a given line in the table in FIG. 8 may be performed in parallel. Note that for each $H_N$, the operations shown in brackets [.] are common to all of the calculations. These operations may be done once and fanned out, and are good spots for pipeline registers.

To accomplish symmetric edge extensions, the operations for $L_0$ and $H_0$ are different, and two operations have been added after $H_4$ The sequence of operations for $[L_1, H_1, L_2, H_2, L_3, H_3]$ shows the pattern of repeated operations. For horizontal filtering, the processing is as shown in FIG. 8. However, for vertical filtering, each $L_N$ or $H_N$ consists of a line rather than a pixel. Thus, for each $L_N$ or $H_N$ line, the processing is performed on every element of the line while remaining in the same configuration.

As an example, for the $H_2$ line, the first element of line $H_2$, the first element of linestore A, and the first element of linestore B are read, and the indicated calculations are performed. The results are then written to the first element of linestore C, the first element of output line $X_3$, the first element of output line $X_4$, and the first element of linestore B.

The next element of line $H_2$, the next element of linestore A, and the next element of linestore B are read, and the same indicated calculations are performed. The results are then written to the next element of linestore C, the next element of output in $X_3$, the next element of output line $X_4$, and the next element of linestore B. This sequence is repeated until all the elements of input line $H_2$ has been processed.

When the next input line ($L_3$) is read, the operations shown for the $L_3$ configuration are done: Data is read from corresponding elements of line $L_3$, linestore B, and linestore A and C. This is repeated until all elements of line $L_3$ have been processed.

The invention can most easily be seen by considering a signal that has been decomposed into a pair of "lowpass" and "highpass" subbands, these subbands were generated either by a convolution or a lifting implementation of a FDWT. The original signal may be reconstructed by the application of an IDWT which consists of 2:1 upsampling each subband, followed by convolution of each upsampled subband with a discrete wavelet of finite extent, and then adding the resulting two signals together to completely reconstruct the original signal. In practice, lifting very efficiently combines these reconstruction steps.

Figure 9:
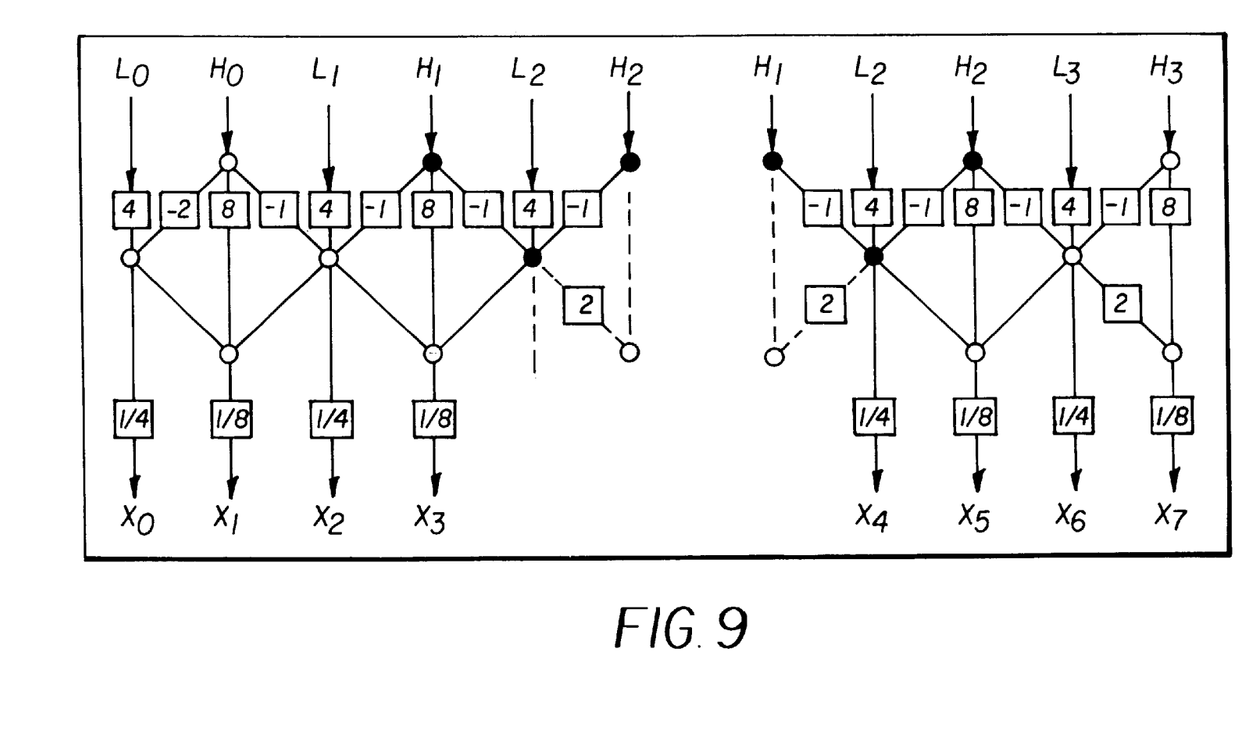
FIG. 9 is a schematic diagram illustrating a split lifting implementation.

If each subband is divided into a left half and a right half, as shown in FIG. 9, at the division boundary, each stage of the lifting operation on the left half overlaps one sample in the right half. Conversely, each stage of the lifting operation on the right half overlaps one sample in the left half. Thus, the left half may be equivalently reconstructed by first appending the leftmost lowpass and highpass samples of the right half of each subband ($L_2$ and $H_2$) to the left half of each subband as shown in FIG. 9, and then performing the lifting operations. The right half may be equivalently reconstructed by first appending the rightmost highpass sample of the left half of each subband ($H_1$) to the right half of each subband in a similar fashion, and then performing the lifting operations. The resulting left half and right half reconstructions may then be joined together to form the complete reconstructed signal. This reconstructed signal will be identical to the signal that would be generated by applying the lifting operation to the complete subbands.

The advantage of the approach shown in FIG. 9 is that multiple lifting operations may run in parallel, with each processing a much smaller number of samples as before. Thus, if each lattice structure is split in half, the number of lifting operations is halved and the overall processing time is halved, similarly if the structure is split into thirds the lifting operation time is also reduced to one-third of the original, etc.

Figure 10:
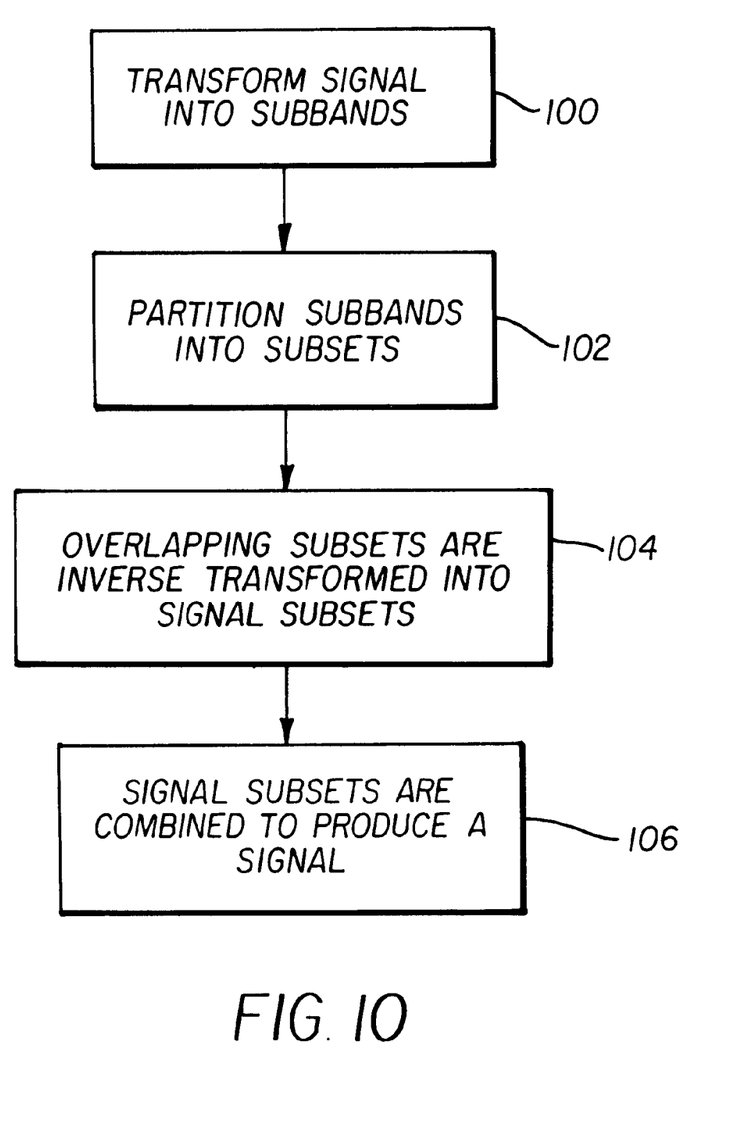
FIG. 10 is flowchart illustrating one embodiment of the invention.

While the invention is described with reference to image processing, it is equally applicable to any form of signal processing which uses discrete wavelet transformation. For example, the invention can be easily used with signals associated with audio, video, etc. As shown in flowchart form in FIG. 10, the invention processes such signals by first transforming the signal into subbands 100 by applying a forward discrete wavelet transform (FDWT) to the signal, which is then compressed, stored, transmitted, etc. When the signal is to be returned to its original state, the subbands are partitioned 102 into overlapping subband subsets. The overlapping subband subsets are inverse transformed 104, in parallel, into signal subsets by applying at least one inverse discrete wavelet transform (IDWT), and the signal subsets are combined 106 to reproduce the signal.

In a preferred embodiment, the IDWT is applied to all of the subband subsets in parallel. The inverse transforming may include lifting to minimize the overlap between adjacent subband subsets. Similarly, the partitioning is performed so as to minimize the overlap between adjacent overlapping subband subsets. The invention also discards excess sample values that occur as a result of the overlap between adjacent subband subsets. The transforming divides the subbands into a highpass subband group and a lowpass subband group. If the FDWT is multi-level, the IDWT is simultaneously applied to each level of the multiple-level FDWT.

In a preferred form, the invention compresses images utilizing inverse discrete wavelet transform by partitioning a set of forward discrete wavelet transform coefficients into two or more overlapping subband subsets, and then simultaneously inverse transforming each subset (using lifting to minimize any overlap between adjacent subband subsets), recombining the subband subsets, and discarding excess sample values that occur as a result of overlap between adjacent subband subsets.

If the partitioning is a multiple-level FDWT, the IDWT is simultaneously applied to each level of the multiple-level FDWT. More specifically, if the partitioning is a two-level FDWT, the IDWT is simultaneously applied to each level of the two-level FDWT. Thus, for example, the partitioning could be a Mallat two-dimensional FDWT. As is well-known in the art, a Mallat transform comprises recursively applying, in each of two separable dimensions, a two-dimensional FDWT to the low frequency subband of a previous such two-dimensional FDWT.

The original subbands may be split in this manner as often as desired in order to allow as many lifting operations to proceed in parallel as desired. The overall number of samples that must be processed is only slightly increased by an amount equal to the total number of overlapping samples at each lifting stage. In the specific case of the Legall 5-3 filter pair shown in FIG. 9, the increase is just three samples per split. This method does not require any changes to the processing during the forward transform; it simply uses some of the transformed coefficients more than once.

While the overall methodology of the invention is described above, the invention can be embodied in any number of different types of systems and executed in any number of different ways, as would be known by one ordinarily skilled in the art. For example, referring to FIG. 11, there is illustrated a computer system 110 for implementing the present invention. Although the computer system 110 is shown for the purpose of illustrating a preferred embodiment, the present invention is not limited to the computer system 110 shown, but may be used on any electronic processing system. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

Figure 11:
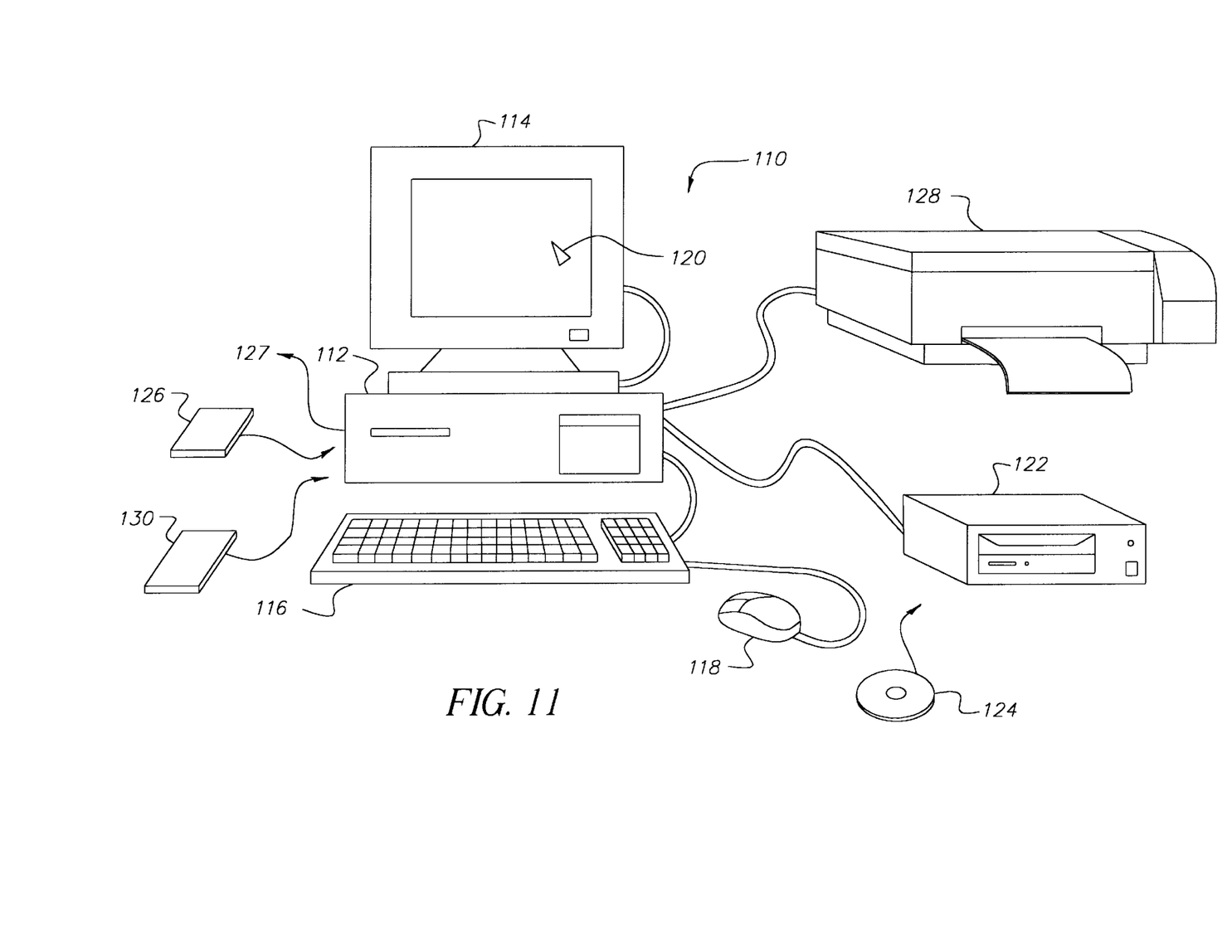
FIG. 11 is a perspective diagram of a computer system for practicing the invention set forth in the preceding figures.

A compact disk-read only memory (CD-ROM) 22 is connected to the microprocessor based unit 112 for receiving software programs and for providing a means of inputting the software programs and other information to the microprocessor based unit 112 via a compact disk 124, which typically includes a software program. In accordance with the invention, this software program could include the image assessment program described herein, as well as programs that utilize its output, such as the automatic image database classification program. In addition, a floppy disk 126 may include the software program, and be inserted into the microprocessor-based unit 112 for inputting the software program. Still further, the microprocessor-based unit 112 may be programmed, as is well known in the art, for storing the software program internally. The microprocessor-based unit 112 may also have a network connection 127, such as a telephone line, to an external network, such as a local area network or the Internet. The program could thus be stored on a remote server and accessed therefrom, or downloaded as needed. A printer 128 is connected to the microprocessor-based unit 12 for printing a hardcopy of the output of the computer system 110.

Images may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor based unit 112 for permitting visual display of the image on the display 114. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera (not shown) or a scanner (not shown). The system would then automatically perform the IDWT methodology discussed above and output the decompressed image on the display 114, through the printer 128 or back to the network 127.

This method may be applied to a multi-level transform, since a similar overlap of coefficients occurs in each additional transform level. This method may also be applied to either or both dimensions of a two-dimensional wavelet transform.

While the invention has been described in terms of a single preferred embodiment, those skilled in the art will recognize that the invention can be practiced with modification within the spirit and scope of the appended claims.

PARTS LIST 110 computer system
112 microprocessor-based unit
114 display
116 keyboard
118 mouse
120 selector
122 CD-ROM
124 CD
126 floppy disk
127 network connection
128 printer
130 PC card

What is claimed is:

1. A method of processing signals comprising:
   transforming a signal into subbands by applying a forward discrete wavelet transform (FDWT) to said signal;
   partitioning said subbands into overlapping subband subsets;
   inverse transforming said overlapping subband subsets into signal subsets by applying at least one inverse discrete wavelet transform (IDWT) to said overlapping subband subsets; and
   combining said signal subsets to reproduce said signal.

2. The method in claim 1, wherein said IDWT is applied to all of said subband subsets in parallel.

3. The method in claim 1, wherein said inverse transforming includes performing lifting upon said subband subsets to minimize an overlap between adjacent overlapping subband subsets.

4. The method in claim 1, wherein said partitioning is performed so as to minimize an overlap between adjacent overlapping subband subsets.

5. The method in claim 1, further comprising discarding excess sample values that occur as a result of overlap between adjacent overlapping subband subsets.

6. The method in claim 1, wherein said transforming comprises dividing said subbands into a highpass subband group and a lowpass subband group.

7. The method in claim 1, wherein said partitioning comprises a multiple-level FDWT and said IDWT is simultaneously applied to each level of said multiple-level FDWT.

8. The method in claim 1, wherein said signal subsets overlap.

9. The method in claim 1, wherein said lifting minimizes an overlap between adjacent overlapping subband subsets.

10. The method in claim 1, wherein said partitioning is performed so as to minimize an overlap between adjacent overlapping subband subsets.

11. The method in claim 1, wherein said transforming comprises dividing said FDWT coefficients into a highpass subband group and a lowpass subband group.

12. A method of image compression utilizing inverse discrete wavelet transform (IDWT), comprising:

partitioning a set of forward discrete wavelet transform (FDWT) coefficients into two or more overlapping subband subsets;

simultaneously performing an IDWT of each subset using lifting, such that an overlap between adjacent subband subsets is minimized;

recombining said subband subsets; and discarding excess sample values that occur as a result of overlap between adjacent subband subsets.

13. The method in claim 12, wherein said partitioning comprises a multiple-level FDWT and said IDWT is simultaneously applied to each level of said multiple-level FDWT.

14. The method in claim 12, wherein said partitioning comprises a two-level FDWT and said IDWT is simultaneously applied to each level of said two-level FDWT.

15. The method in claim 12, wherein said partitioning comprises a Mallat two-dimensional FDWT.

16. A computer program product for processing signals, said computer program product comprising a computer readable storage medium having a computer program stored thereon for performing a method comprising:

transforming a signal into subbands by applying a forward discrete wavelet transform (FDWT) to said signal;

partitioning said subbands into overlapping subband subsets;

inverse transforming said overlapping subband subsets into signal subsets by applying at least one inverse discrete wavelet transform (IDWT) to said overlapping subband subsets; and combining said signal subsets to reproduce said signal.

17. The computer program product in claim 16, wherein said IDWT is applied to all of said subband subsets in parallel.

18. The computer program product in claim 16, wherein said inverse transforming includes performing lifting upon said subband subsets to minimize an overlap between adjacent overlapping subband subsets.

19. The computer program product in claim 16, wherein said partitioning is performed so as to minimize an overlap between adjacent overlapping subband subsets.

20. The computer program product in claim 16, further comprising discarding excess sample values that occur as a result of overlap between adjacent overlapping subband subsets.

21. The computer program product in claim 16, wherein said transforming comprises dividing said subbands into a highpass subband group and a lowpass subband group.

22. The computer program product in claim 16, wherein said partitioning comprises a multiple-level FDWT and said IDWT is simultaneously applied to each level of said multiple-level FDWT.

23. The computer program product in claim 16, wherein said signal subsets overlap.

* * * * *